J. BADGER.
HORSE HAY-RAKE.

No. 190,729. Patented May 15, 1877.

WITNESSES:
Chas. Nida
J. H. Scarborough

INVENTOR:
J. Badger
BY
Munn & Co.
ATTORNEYS.

UNITED STATES PATENT OFFICE.

JOHN BADGER, OF BELVIDERE, ILLINOIS.

IMPROVEMENT IN HORSE HAY-RAKES.

Specification forming part of Letters Patent No. 190,729, dated May 15, 1877; application filed January 6, 1877.

*To all whom it may concern:*

Figure 1:
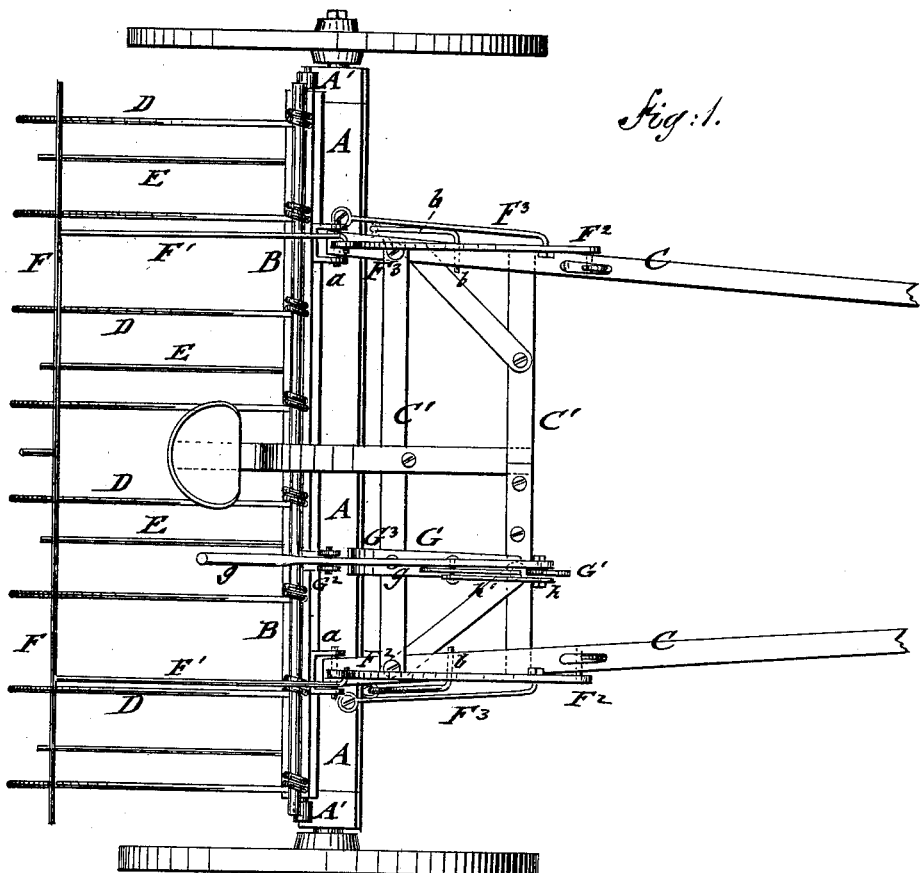
Figure 2:
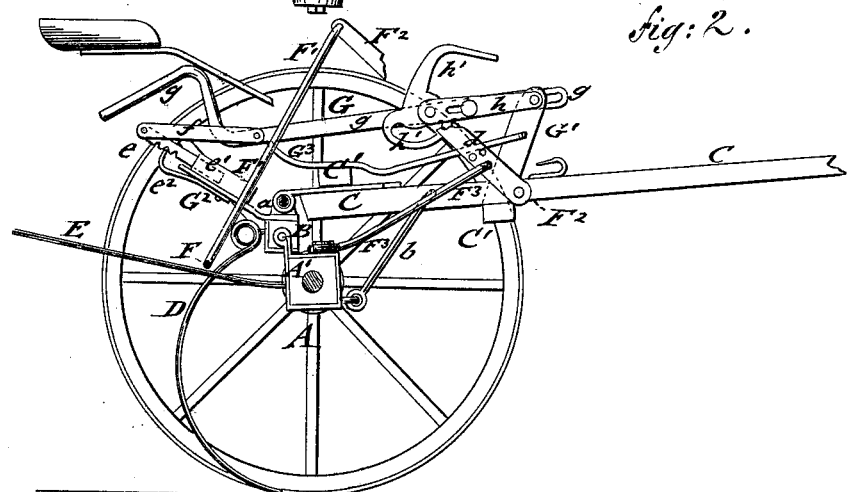

Be it known that I, JOHN BADGER, of Belvidere, in the county of Boone and State of Illinois, have invented a new and Improved Horse Hay-Rake, of which the following is a specification:

In the accompanying drawing, Figure 1 represents a top view, and Fig. 2 a sectional side elevation, of my improved horse hay-rake.

Similar letters of reference indicate corresponding parts.

This invention relates to improvements in horse hay-rakes, by which the hay is cleared completely from the rake-teeth in dumping, and the teeth locked into rigid position when in operation, and readily adjusted to different heights from the ground.

The invention will first be described in connection with the drawing, and then pointed out in the claims.

In the drawing, A represents the axle of my improved horse hay-rake, and A′ metallic seats or brackets near the ends, for the pivots of the rake-head B, which is thereby supported above and to the rear of the axle A.

The thills C are hinged to brackets $a$ at the top of the rake-head B, and stiffened by lateral brace-pieces C′, that serve for a support for the driver's seat and the operating-lever mechanism of the rake. The thills C are connected by brace-rods $b$ to the axle A, the lower ends of the rods $b$ being applied by eyes to staples of the axle.

The rake-teeth D are applied to the rear side of the rake-head B, and rigidly attached thereto in the customary manner.

The clearers E are firmly secured to the axle, and extended at slight upward inclination in backward direction. They assist the dumping of the hay raked up by the teeth D, and have a slight upward motion, caused by the flexible connection of the axle with the rake-head and hinged thills, so that thereby the strain on the cleaners in dumping is materially reduced, and the cleaners made less liable to break.

The hay adhering to the rake-teeth is entirely removed by a lateral clearer-rod, F, with short teeth, which rest, during the downward or working position of the rake-teeth, on the upwardly-inclined clearers E, and travel over the entire length of the teeth, or any desired distance along the same when the teeth are raised for the purpose of discharging jointly with the clearers E the gathered load.

The movable clearer-rod F is operated by a double-acting lever mechanism, $F^2$ $F^3$, that is operated jointly with the raising of the rake-teeth by the compound lever G.

The lateral clearer-rod F is pivoted, by connecting-rods $F^1$, to the upper ends of lever $F^2$, whose lower end is pivoted to the thills C.

Fixed braces $F^3$ are attached to the axle and secured to perforations $d$ of lever $F^2$, at varying distances from the end pivots, for the purpose of regulating the extent of motion of the lateral clearer-rod on the rake-teeth.

The compound lever G is supported on a standard, $G^1$, secured to a cross-piece, C′, of the thills, and to an inclined standard, $G^2$, of the rake-head B, and made of four parts, a toothed part or rack-iron, $e$, sliding in socket $e^1$ of rear standard $G^2$, and secured thereto by a strong spring-pawl, $e^2$, a connecting pivot-link, $f$, a main lever and curved handle, $g$, and of a guide-bar, $h$, with adjustable cam-lever $h'$.

The rack-iron $e$ serves to adjust the rake-teeth into higher or lower position, while the cam-lever $h'$, by a curved slot, lengthens or shortens the main lever $g$, which is moved by slots and pins along guide-bar $h$, for the purpose of regulating the teeth without stopping the rake when small variations in the position of the same are required.

The compound lever G is raised or lowered by the handle $g$, and thereby the rake-teeth swung up for dumping, or thrown down for work. When the lever G is in downward position, the pivot-link $f$, main lever $g$, and guide-bar $h$ are brought into line, and form a kind of lock by being brought below the center of motion so as to brace each other, the compound lever G resting in this position on a supporting-piece, $G^3$, of cross-piece C′ of the thills, and remaining securely in this position until raised by the curved handle from the driver's seat.

The raising and lowering of the compound lever actuates, also, jointly with the raising or lowering of the rake-teeth, by the motion imparted to rake-head, axle, and thill, the double-acting levers of the lateral clearer-bar F, so that the same is worked simultaneously with the rake-teeth, and passed over the same for clearing them entirely of all adhering hay.

The dumping of the gathered hay is thereby accomplished in perfect manner, and the rake controlled by the operation of the compound lever merely, which facilitates the working of the rake by the driver, and simplifies the manipulations of the same.

Having thus described my invention, I claim as new and desire to secure by Letters Patent—

1. In a horse hay-rake, the combination, with the axle of the rake, of a rake-head pivoted above and back of the same, and of thills hinged to the rake-head and connected by braces to the axle, to produce flexible connection of axle, rake-head, and thills, substantially as and for the purpose set forth.

2. The combination, in a horse hay-rake, with the axle of the rake, of a rake-head swinging in brackets on the axle above and back of the same, and of thills hinged to the top of the rake-head, substantially as specified.

3. The combination of clearer-bar F, having rods $F^1$, with levers $F^2$, pivoted to thills C, and lever-arms $F^3$, secured to axle and fulcrumed in adjustable manner to perforations of levers $F^2$, to control extent of motion of clearer-bar, substantially as set forth.

4. The combination, with axle, of rake head B, clearers D, traversing clearer-bar F, double-acting levers $F^2$ $F^3$, and compound lever G, to produce simultaneous operation of rake-teeth, clearers, and lateral clearer-bar, substantially as set forth.

JOHN BADGER.

Witnesses:
   WILLIAM R. DODGE,
   EDWARD E. PETTIT.